United States Patent Office 2,742,366
Patented Apr. 17, 1956

2,742,366
SALT SUBSTITUTE AND METHOD OF PREPARING THE SAME

Ruth M. Power, Waltham, Mass., assignor to Arthur D. Little, Inc., Cambridge, Mass., a corporation of Massachusetts No Drawing. Application October 18, 1952,
Serial No. 315,579

10 Claims. (Cl. 99—143)

The present invention relates to a composition useful as a substitute for salt. More particularly, it relates to a composition and a method for the preparation of said composition to be used as a substitute for salt.

There are several products on the market today which are of low sodium content and are used by people who must eliminate or minimize the sodium chloride in their diet. Up to the present time, there has not been available any substitue for salt that has the same taste characteristics and physical appearance as salt, and much effort has been expended to prepare a salt substitute having the same taste characteristics and physical appearance as common table salt and which can be added to foods at the table as well as in their cooking.

It is an object of the instant invention to provide a process for the preparation of an improved composition which is a salt substitute.

It is a further object of the instant invention to provide an improved salt substitute composition which looks and tastes like salt.

It is a further object of the instant invention to provide a process for preparing a salt substitute composition which closely approaches the taste of salt and the particles of which are white and granular, having the same general appearance as salt.

These and other objects of the instant invention will become more apparent upon a fuller understanding of the invention as hereinafter described.

A composition which closely approaches the taste and appearance of salt contains betweent about 40% and about 90% by weight of potassium chloride, between about 5% and about 50% by weight of a sugar, and up to about 10% by weight of a glutamate salt of an alkaline metal having an atomic weight higher than 23, giving a total of 100% by weight. By the term "alkaline metal" is meant alkali metals and alkaline earth metals having an atomic weight higher than 23. Glutamate salts which may be employed include the potassium, magnesium and calcium salts. Monocalcium glutamate is preferably employed.

A salt substitute composition which has a low sodium content is also prepared in accordance with the instant invention. The allowance of about 200 milligrams of sodium per day is typical of a restricted sodium diet. A small amount of sodium chloride can be added to the instant novel composition for this purpose. Generally, not more than about 5% by weight, based on the total weight of all the other ingredients, of sodium chloride is so added.

More specifically, a composition is prepared by combining, for example, between about 50% and about 70% by weight of potassium chloride with sugar in amount such that the sugar and potassium chloride total about 86% by weight of the composition, and adding up to about 10% of monocalcium glutamate to the potassium chloride-sugar mixture. Generally, between about 50% and about 70% by weight of potassium chloride is combined with between about 15% and about 35% by weight of sucrose, or with sucrose-dextrose mixture, in which the sucrose to dextrose ratio is between about 1:1 and about 1:3, and the monocalcium glutamate is added to this admixture. Although potassium chloride, sugar and monocalcium glutamate are the essential constituents, the composition is improved by the addition of calcium chloride and tartaric acid in small amounts.

In a preferred embodiment of the instant invention the composition contains between about 50% and about 62% by weight of potassium chloride, between about 12% and about 17% by weight of sucrose, between about 12% and about 17% by weight of dextrose monohydrate, between about 5% and about 6% by weight of calcium chloride, and between about 2% and about 5% by weight of tartaric acid, the amounts used totalling always 100% by weight.

In another embodiment the composition is prepared by mixing monocalcium glutamate, dextrose tartaric acid, and calcium chloride. The particles of these constituents are preferably of such size that they pass through about a 40 mesh size Tyler standard screen. The resulting mixture is moistened with distilled water or water which is substantially free of sodium ions, and the resulting mixture is granulated to pass a screen of between about 20 and about 30 mesh size. The granulated mixture is then dried, and the dried mixture screened. The fraction between about 40 and about 60 mesh size is collected, and the particles finer than about 60 mesh are recycled to the granulation step. The size of the particles in the mixture is a matter of choice and the range of between about 40 and about 60 mesh has been selected because the particles of ordinary table salt are generally about this size. However, particles larger or smaller than 40 to 60 mesh may be employed, if desired.

The above mixture of monocalcium glutamate, dextrose, tartaric acid and calcium chloride is then mixed with the potassium chloride and sugar. The potassium chloride and the sugar particles are also preferably sized to between about 40 and about 60 mesh size. If desired between about 0.5% and about 1% by weight of a stabilizer such as calcium stearate may be added to the resulting salt substitute composition. The stearate has little or no taste effect, but merely minimizes pickup of moisture by the composition. If desired, the sugar can be granulated with the monocalcium glutamate-dextrose mixture described above, and the potassium chloride and stearate added to this granulated mixture. It is preferred to granulate some of the constituents rather than to mechanically mix all of the constituents, because by granulating some of the constituents together, a more uniform composition is obtained and maintained, and a better balance of flavor results.

The flavor characteristics of salt are duplicated by a balance of the proper constituents. The taste characteristics of common salt have been found to comprise saltiness, tingle, warmth, saliva stimulation, bitterness, sweetness and salty aftertaste. In the instant composition, the constituents are selected and combined in such relative amounts as to provide each of these characteristics in the same degree in which they are present in common table salt.

The following table shows by way of a specific example and a suitable range for varied examples the constituents in the novel salt substitute compositions.

Table

| Constituents | Specific Composition, Percent | Range, Percent |
| --- | --- | --- |
| Calcium Glutamate | 5.3 | 1–10 |
| Dextrose | 16.2 | 0–25 |
| Tartaric Acid | 2.6 | 0–3 |
| Calcium Chloride | 5.3 | 0–10 |
| Potassium Chloride | 53.7 | 40–90 |
| Sucrose | 16.2 | 5–50 |
| Calcium Stearate | .7 | 0.5–1 |

In preparing various compositions by utilizing the information in the above table, only one constituent at a time should be widely varied over the range. For example, if the amount of calcium glutamate is varied within the above range, the amounts of the other constituents should be kept close to the percentage in the specific composition above.

The following specific preparation is presented in order to afford a clearer understanding of the practice of the instant invention, but it is to be distinctly understood that this composition as well as the contents of the table are illustrative only and that there is no intention to limit the invention thereto.

*Specific Composition*

About 40 grams of monocalcium glutamate, about 120 grams of dextrose, about 20 grams of tartaric acid, and about 40 grams of calcium chloride were mixed and passed through a 40 mesh screen. The resulting mixture was moistened with distilled water in order to obtain a friable lump. The resulting mixture was granulated by passing through a 30 mesh size screen, and the granulated mixture was dried. The dried mixture was screened and the particles between about 40 and about 60 mesh were collected. The particles finer than about 60 mesh were recycled to the granulation step. About 400 grams of potassium chloride and about 120 grams of sucrose which had been passed through a 40 mesh screen were mixed with the 40 to 60 mesh fraction. About 5 grams of calcium stearate was added to the resulting mixture. The resulting composition was free of sodium, had the appearance of, and tasted like common salt.

Having thus fully described and illustrated the character of the invention, what is desired to be secured and claimed by Letters Patent is:

1. A dietary low-sodium salt substitute containing between about 50% and about 70% by weight of potassium chloride, between about 5% and about 25% by weight of sucrose, between about 10% and about 25% by weight of dextrose, between about 1% and about 10% by weight of monocalcium glutamate, up to about 3% by weight of tartaric acid, up to about 10% by weight of calcium chloride, and up to about 1% by weight of calcium stearate.

2. A dietary low-sodium salt substitute containing between about 25% and about 62% by weight of potassium chloride, between about 12% and about 17% by weight of sucrose, between about 12% and about 17% by weight of dextrose, between about 5% and about 6% by weight of calcium chloride, and between about 2% and about 5% by weight of tartaric acid.

3. A dietary low-sodium substitute composition, containing about 5.3% by weight of monocalcium glutamate, about 16.2% by weight of dextrose, about 2.6% by weight of tartaric acid, about 5.3% by weight of calcium chloride, about 53.7% by weight of potassium chloride, about 16.2% by weight of sucrose, and about 0.7% by weight of calcium stearate.

4. A process for the preparation of a dietary low-sodium salt substitute, which comprises combining between about 52% and about 62% by weight of potassium chloride, between about 12% and about 17% by weight of sucrose, between about 12% and about 17% by weight of dextrose, between about 5% and about 6% by weight of calcium chloride, and between about 2% and about 5% by weight of tartaric acid.

5. A process for the preparation of a dietary low-sodium salt substitute, which comprises combining about 5.3% by weight of monocalcium glutamate, about 16.2% by weight of dextrose, about 2.6% by weight of tartaric acid, about 5.3% by weight of calcium chloride, about 53.7% by weight of potassium chloride, about 16.2% by weight of sucrose, and about 0.7% by weight of calcium stearate.

6. A method for the preparation of a dietary low-sodium salt substitute, which comprises combining between about 1% and about 10% by weight of monocalcium glutamate, between about 10% and about 25% by weight of dextrose, up to about 3% by weight of tartaric acid, up to about 10% by weight of calcium chloride, passing the resulting mixture through an about 40 mesh screen, moistening the screened mixture and granulating by passing it through a screen of between about 20 and about 30 mesh size, drying the granulated mixture, screening the dried mixture and collecting the fraction between about 40 mesh and about 60 mesh, adding to said fraction between about 40% and about 90% by weight of potassium chloride and between about 5% and about 25% by weight of sucrose, and adding up to about 1% by weight of calcium stearate to the resulting mixture.

7. A method for the preparation of a dietary low-sodium salt substitute, which comprises combining between about 5% and about 6% by weight of monocalcium glutamate, between about 12% and about 16% by weight of dextrose, between about 2% and about 5% by weight of tartaric acid, between about 5% and about 6% by weight of calcium chloride, passing the resulting mixture through an about 40 mesh screen, moistening the screened mixture with water which is free of sodium ions, and granulating it by passing it through a screen between about 20 and about 30 mesh size, drying the resulting mixture, screening the dried mixture and collecting the fraction between about 40 mesh and about 60 mesh, and adding to said fraction between about 55% and about 62% by weight of potassium chloride and between about 12% and about 16% by weight of sucrose, the particles of which are between about 40 and about 60 mesh.

8. A method for the preparation of a dietary low-sodium salt substitute, which comprises combining about 5.3% by weight of monocalcium glutamate, about 16.2% by weight of dextrose, about 2.6% by weight of tartaric acid, about 5.3% by weight of calcium chloride, passing the resulting mixture through an about 40 mesh screen, moistening and granulating the screened mixture, drying the granulated particles, screening the dried mixture and collecting the fraction between about 40 mesh and about 60 mesh, adding to said fraction about 53.7% by weight of potassium chloride and about 16.2% by weight of sucrose, the particles of which are between about 40 and about 60 mesh, and adding about 0.7% calcium stearate to the resulting composition.

9. A dietary low-sodium salt substitute which contains between about 50% and about 70% by weight of potassium chloride, between about 15% and about 35% by weight of sugar, between about 1% and about 10% by weight of monocalcium glutamate, and up to about 5%, based upon the total weight of the aforementioned ingredients, of sodium chloride.

10. A dietary low-sodium salt substitute containing between about 50% and about 70% by weight of potassium chloride, between about 5% and about 25% by weight of sucrose, between about 10% and about 25% by weight of dextrose, between about 1% and about 10% by weight of monocalcium glutamate, up to about 3% by weight of tartaric acid, up to about 10% by weight of calcium chloride, up to about 1% by weight of calcium stearate, and up to about 5%, based upon the total weight of the aforementioned ingredients, of sodium chloride.

References Cited in the file of this patent

UNITED STATES PATENTS

| | | |
|---|---|---|
| 1,874,055 | Liebrecht | Aug. 30, 1932 |
| 1,998,179 | Wolf | Apr. 16, 1935 |
| 2,032,612 | Griffith et al. | Mar. 3, 1936 |
| 2,288,409 | Lippman | June 30, 1942 |
| 2,471,144 | Davy | May 24, 1949 |

FOREIGN PATENTS

| | | |
|---|---|---|
| 421,554 | Great Britain | Dec. 24, 1934 |